Feb. 1, 1927.
F. R. WARREN
HAME HOOK
Filed Sept. 18, 1925
1,616,013
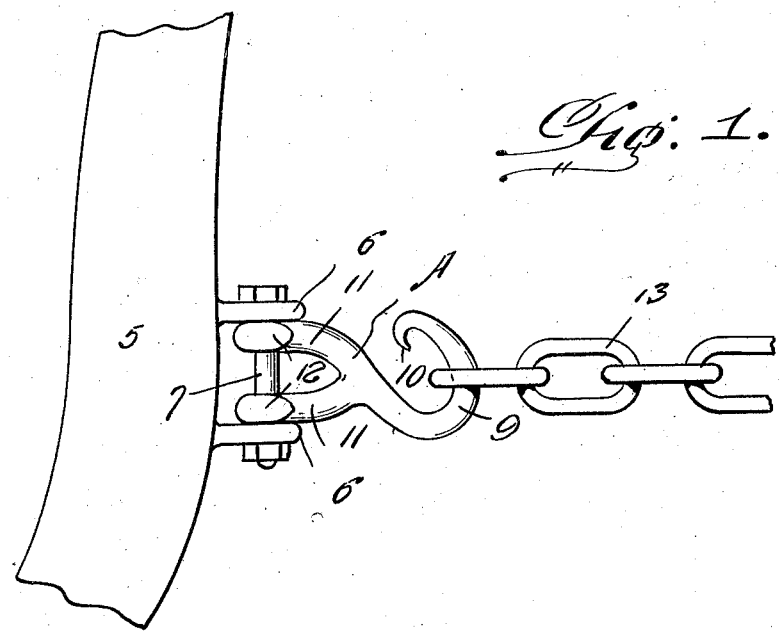
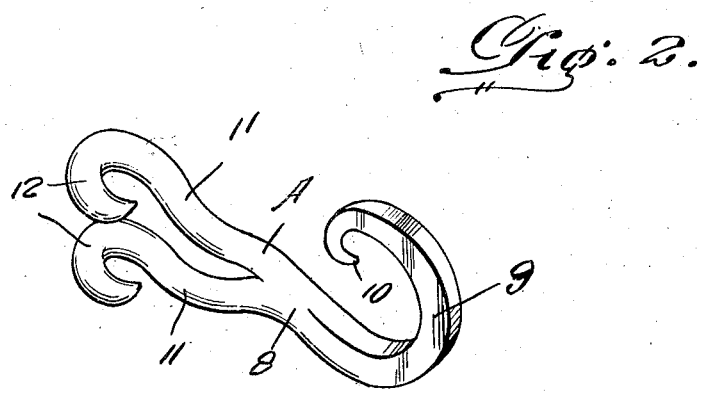
Inventor
F. R. Warren,
By Clarence A. O'Brien
Attorney Patented Feb. 1, 1927.

1,616,013

UNITED STATES PATENT OFFICE.

FREED R. WARREN, OF BADGETT, TENNESSEE.

HAME HOOK.

Application filed September 18, 1925. Serial No. 57,117.

The present invention appertains to improvements in hames and has for one of its important objects to provide an improved hook or loggerhead by which the traces or tugs may be adjusted without so much trouble as has been the case in the past.

Another important object of the invention is to provide an improved hook or loggerhead as a new article of manufacture which is exceedingly simple in its construction, inexpensive to manufacture, strong, durable, easy to manipulate, efficient, reliable, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a fragmentary view of a hame embodying the features of my invention, and Figure 2 is a detail perspective of the hook or logger head.

Referring to the drawing in detail it will be seen that 5 designates a hame which has projecting from the side thereof a pair of spaced parallel apertured ears 6 through which extends a bolt 7. My improved hook indicated generally by the letter A is mounted on the bolt 7 between the ears 6. This hook or logger head A includes a shank 8 having a hook 9 formed at one end with an inwardly curved terminal 10, and a pair of branches 11 extending from the other end of the shank and terminating in hooks 12. The branches 11 diverge from each other and are in substantially the same plane with the shank 8 and the hook 9. The hooks 12, however, are in substantial parallel planes, said parallel planes being rectangularly disposed to the plane of the hook 9. The hooks 12 are adapted to rotate about the bolt 7. The hook 9 is adapted to be engaged with one of the links of the trace or tug 13.

It is thought that the construction of my device will now be clearly understood without a more detailed description thereof. It is desired, however, to point out that the hook or logger head, as it is now known on the late model hames, has a hook on the ends so that one does not have to take the logger head out to adjust the trace or tug, thereby eliminating the trouble given by the old loggerhead as after said old loggerhead was placed on the hame it would become rusty, and could hardly be taken off without a hammer to knock it loose from the hame. My improved device, will not have to be removed at all in order to adjust the trace, and thus considerable time and labor would be saved in adjusting the trace. The improved hook shown herewith extends outwardly from the hame a sufficient distance so that it will not come into contact with the collar as is quite common in like hooks now in use, which cause considerable wear on the collar. My improved hook or loggerhead may be used on any of the modern hames now being placed on the market.

The present embodiment of the invention has been disclosed merely by way of example as it attains the features of advantage enumerated as desirable in the statement of the invention, and the above description.

It will be apparent, however, that the embodiment is capable of numerous changes in the details of construction, and in the combination and arrangement of parts without departing from the spirit or scope of the invention as hereinafter claimed or sacrificing any of its advantages.

Having thus described the invention, what is claimed as new is:—

As a new article of manufacture, a logger head for a hame including a shank, one end of the shank merging into a hook, the other end of the shank merging into a hook, the first-mentioned hook having its plane at right angle to the plane of the second hook, a branch extending from an intermediate portion of the shank at an acute angle thereto and merging into a hook having its plane parallel with the first-mentioned hook, the planes of the first and third mentioned hooks being disposed at an acute angle to said shank.

In testimony whereof I affix my signature.

FREED R. WARREN.